(12) United States Patent
Inouchi et al.

(10) Patent No.: US 7,388,809 B2
(45) Date of Patent: Jun. 17, 2008

(54) FISH FINDER THAT TRANSMITS ULTRASONIC WAVES, RECEIVES ECHO SIGNALS, AND PERFORMS INTERFERENCE REMOVAL

(75) Inventors: Mitsuhiro Inouchi, Nishinomiya (JP); Makoto Shibata, Nishinomiya (JP)

(73) Assignee: Furuno Electric Company, Limited, Nishinomiya-shi (JP)

( * ) Notice: Subject to any disclaimer, the term of this patent is extended or adjusted under 35 U.S.C. 154(b) by 33 days.

(21) Appl. No.: 11/528,575

(22) Filed: Sep. 28, 2006

(65) Prior Publication Data

US 2008/0080316 A1    Apr. 3, 2008

(51) Int. Cl.
*G01S 15/96*    (2006.01)
(52) U.S. Cl. ...................................................... 367/98
(58) Field of Classification Search ................. 367/98
See application file for complete search history.

(56) References Cited

U.S. PATENT DOCUMENTS 5,260,912 A * 11/1993 Latham ....................... 367/98
5,930,200 A * 7/1999 Kabel ......................... 367/87
6,335,905 B1 * 1/2002 Kabel ......................... 367/98

FOREIGN PATENT DOCUMENTS

| JP | 57054876 A | * | 4/1982 |
| JP | 62240885 A | * | 10/1987 |
| JP | 03248081 A | * | 11/1991 |
| JP | 2003-322678 A | | 11/2003 |

* cited by examiner

*Primary Examiner*—Dan Pihulic
(74) *Attorney, Agent, or Firm*—Birch, Stewart, Kolasch & Birch, LLP

(57) ABSTRACT

A fish finder includes a transducer that repeatedly transmits ultrasonic pulse signals downward into the water and receives signals from the water, a first signal generating unit that generates a first signal on the basis of a reception signal at an identical depth caused by signals transmitted at least twice, and an interference detecting unit that detects an occurrence of interference on the basis of plural first signals at different depths.

10 Claims, 3 Drawing Sheets

FISH FINDER THAT TRANSMITS ULTRASONIC WAVES, RECEIVES ECHO SIGNALS, AND PERFORMS INTERFERENCE REMOVAL

BACKGROUND OF THE INVENTION

1. Field of the Invention

The present invention relates to a fish finder that transmits and receives ultrasonic waves to find a shoal of fish in the water, and, more particularly to a fish finder that detects occurrence of interference caused by other ultrasonic devices and automatically performs interference removal.

2. Description of the Related Art

In general, a fish finder mounted on a fishing boat has a problem of interference caused by ultrasonic waves transmitted by other ultrasonic devices mounted on the fishing boat or other boats operating in sea areas near the fishing boat.

Conventionally, as means for solving this problem, a fish finder having an interference removal function is known. With this interference removal function, the fish finder compares, for each identical depth, reception signals obtained by transmission and reception performed plural times and selects a weakest signal to perform processing for interference removal.

When the interference removal function is used, there is an inconvenience that not only interference signals but also useful echoes including information on a shoal of fish or the like is controlled. Thus, when no interference occurs, the interference removal function should be turned off as much as possible. However, in the conventional apparatus, a user needs to judge at any time whether there exists interference and manually perform on/off operation for the interference removal function. As a result, the user is forced to perform troublesome operation.

SUMMARY OF THE INVENTION

It is an object of the invention to provide a fish finder that can detect presence or absence of interference and automatically turn on and off an interference removal function without bothering a user.

According to the invention, there is provided a fish finder comprising a transducer that repeatedly transmits ultrasonic pulse signals downward into water and receives echo signals from the water, an A/D converter that converts the signal received by the transducer into a digital signal, a memory that stores the signal outputted from the A/D converter, an interference detecting unit that detects an occurrence of interference on the basis of a reception signal belonging to a predetermined depth range among reception signals stored in the memory, and an interference removing unit that when the interference detecting unit detects an occurrence of interference, outputs a signal obtained by applying predetermined interference removal processing to the reception signal.

According to the invention, there is provided an interference detection method in a fish finder comprising a step of repeatedly transmitting ultrasonic pulse signals downward into water and receiving signals from the water, a step of generating a first signal on the basis of reception signals at an identical depth resulting from a plurality of transmission signals, and a step of detecting an occurrence of interference on the basis of plural first signals at different depths.

DESCRIPTION OF THE PREFERRED EMBODIMENTS

An embodiment of the invention will be explained with reference to FIG. 1.

Figure 1:
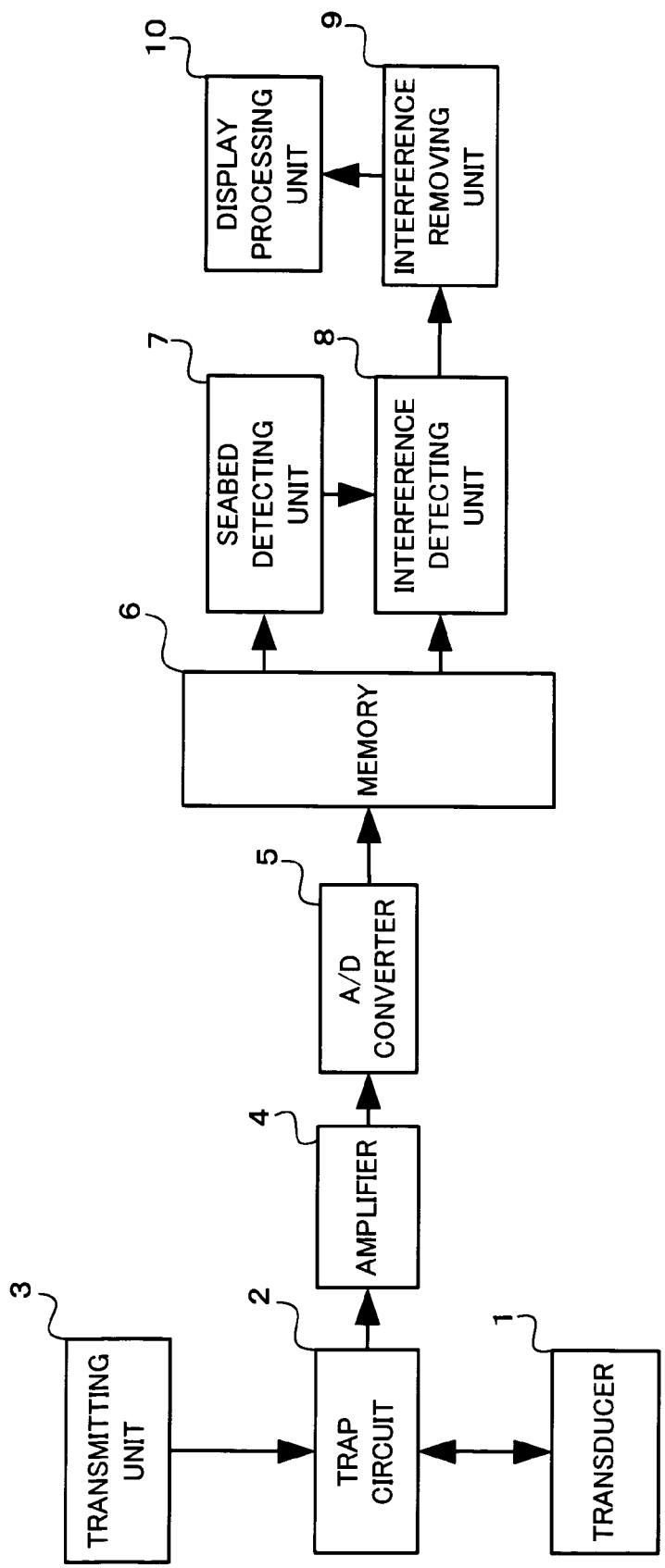
FIG. 1 is a diagram for explaining an embodiment of the invention.

In FIG. 1, a transducer 1 mounted on a ship bottom or the like is driven by an electric signal supplied from a transmitting unit 3 via a trap circuit 2 to transmit an ultrasonic pulse signal into the sea and receive echo of the ultrasonic pulse signal reflected by a target in the sea and outputs a reception signal to an amplifier 4 via the trap circuit 2. The amplifier 4 amplifies the reception signal. An A/D converter 5 converts the amplified signal into a digital signal. A memory 6 sequentially stores reception signals converted into digital signals.

Figure 2:
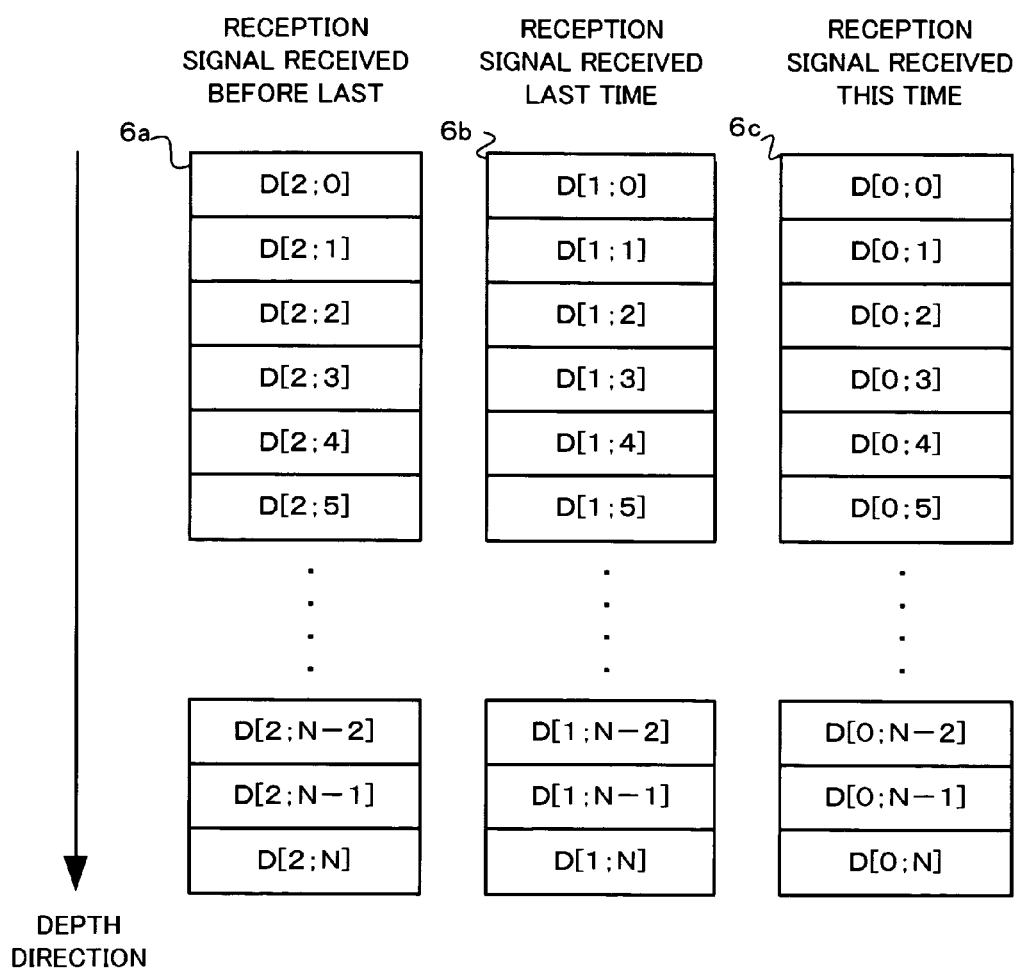
FIG. 2 is a diagram for explaining a structure of a memory 6.

A structure of the memory 6 will be explained with reference to FIG. 2.

The memory 6 includes plural line memories that store data sequences of reception signals, which are obtained by one transmission, in an order of depths. The memory 6 stores data sequences of reception signals for several times of transmission. The memory 6 in FIG. 2 includes line memories 6a, 6b, and 6c of three rows and can store reception signals for transmission and reception for three times. In the memory 6, the line memory 6c (D[0;0] to D[0;N]) stores a reception signal received this time (at a time), the line memory 6b (D[1;0] to D[1;N]) stores a reception signal received last time (a previous time), and the line memory 6a (D[2;0] to D[2;N]) stores a reception signal received before last (two times previous to the time). When a transmission and reception operation is performed anew, a data sequence of a reception signal obtained by the latest transmission is written in the line memory 6c on the right side. At the same time, data sequences of reception signals obtained by transmission before the last time are rewritten in the line memories while being shifted to the left by one row every time the a data sequence is rewritten. Oldest data sequence stored in the left line memory 6 is erased.

A seabed detecting unit 7 detects a seabed position for every transmission and reception on the basis of the data stored in the memory 6. The detection of a seabed position is performed on the basis of, for example, whether intensity of an echo signal has exceeded a predetermined value set in advance. Information on the seabed position detected is sent to an interference detecting unit 8.

The interference detecting unit 8 reads out the reception signal received this time and the reception signal received last time stored in the memory 6. The interference detecting unit 8 judges presence or absence of interference on the basis of the reception signals and outputs information on presence or absence of interference to an interference removing unit.

Specifically, the judgment on presence or absence of interference in the interference detecting unit 8 is performed as described below.

The interference detecting unit 8 compares, for each same depth, the latest reception data sequence and the reception data sequence of the last time stored in the memory 6. When the latest reception data is larger than the reception data received last time, the interference detecting unit 8 calculates a subtraction value obtained by subtracting the reception data of the last time from the latest reception data. (The subtraction value is one example of "a first signal" in claims.) The interference detecting unit 8 adds up subtraction values from data immediately after starting reception (or data after elapse of a predetermined time from start of reception) to data of a seabed position (or data of a position shallower than a seabed position by a predetermined depth) and sets the obtained addition value as Tk. As the seabed position, a shallower one of two seabed positions based on the reception signals received last time and this time, which are detected by the seabed detecting unit 7, is adopted.

Although not described above to facilitate understanding, it is desirable to remove data of a portion corresponding to an oscillation line or tailing of the oscillation line (e.g., data immediately after start of reception such as D[0;0] to D[0;10]) from data to be used for the processing in the interference detecting unit 8. The oscillation line is mainly caused by leakage of a part of a transmission signal to a reception circuit via the trap circuit 2.

When the addition value Tk is larger than a threshold A corresponding to a detection range, the interference detecting unit 8 judges that interference has occurred. When the addition value Tk is smaller than the threshold A, the interference detecting unit 8 judges that interference has not occurred. As the threshold A, a value inputted by a user using predetermined input means or a value stored in storing means in association with a value of the detection range which is automatically set on the basis of a depth of the seabed is appropriately read out and used.

In addition, the interference detecting unit 8 judges intensity of interference removal processing (the intensity is represented as NL1 and NL2 in order from lowest intensity) that should be executed by an interference removing unit 9 and gives an instruction to the interference removing unit 9. Specifically, when the interference detecting unit 8 detects interference once in a state in which there has been no interference, the interference detecting unit 8 judges that interference removal processing of the intensity NL1 is appropriate and instructs the interference removing unit 9 to execute the interference removal processing of the intensity NL1. When the interference detecting unit 8 subsequently detects interference once more, the interference detecting unit 8 judges that interference removal processing of the intensity NL2 is appropriate and instructs the interference removing unit 9 to execute the interference removal processing of the intensity NL2. When the interference detecting unit 8 detects interference further more, the interference detecting unit 8 judges to continue the interference removal processing of the intensity NL2 is appropriate and instructs the interference removing unit 9 to continue to execute the interference removal processing of the intensity NL2. If interference is not detected any more, the interference detecting unit 8 gives the interference removing unit 9 an instruction that the interference removal processing does not have to be performed.

The interference removing unit 9 executes the interference removal processing for a reception signal on the basis of information on presence or absence of an occurrence of interference and information on intensity of the interference removal processing given by the interference detecting unit 8.

The interference removal processing executed by the interference removing unit 9 will be explained.

In the weak interference removal processing (NL1) executed by the interference removing unit 9, the interference removing unit 9 selects, for each identical depth, a signal with lower intensity out of reception signals for two times (reception signals received this time and last time) and outputs the signal. On the other hand, in the intense interference removal processing (NL2) executed by the interference removing unit 9, the interference removing unit 9 selects, for each identical depth, a signal with lowest intensity out of reception signals for three times (reception signals received this time, last time, and before last) and outputs the signal. When the interference removal processing is unnecessary, the interference removing unit 9 directly outputs the received reception signal which is inputted this time.

A display processing unit 10 processes a signal outputted by the interference removing unit 9 and generates a display signal. A not-shown display unit displays images of a shoal of fish and the seabed.

Figure 3:
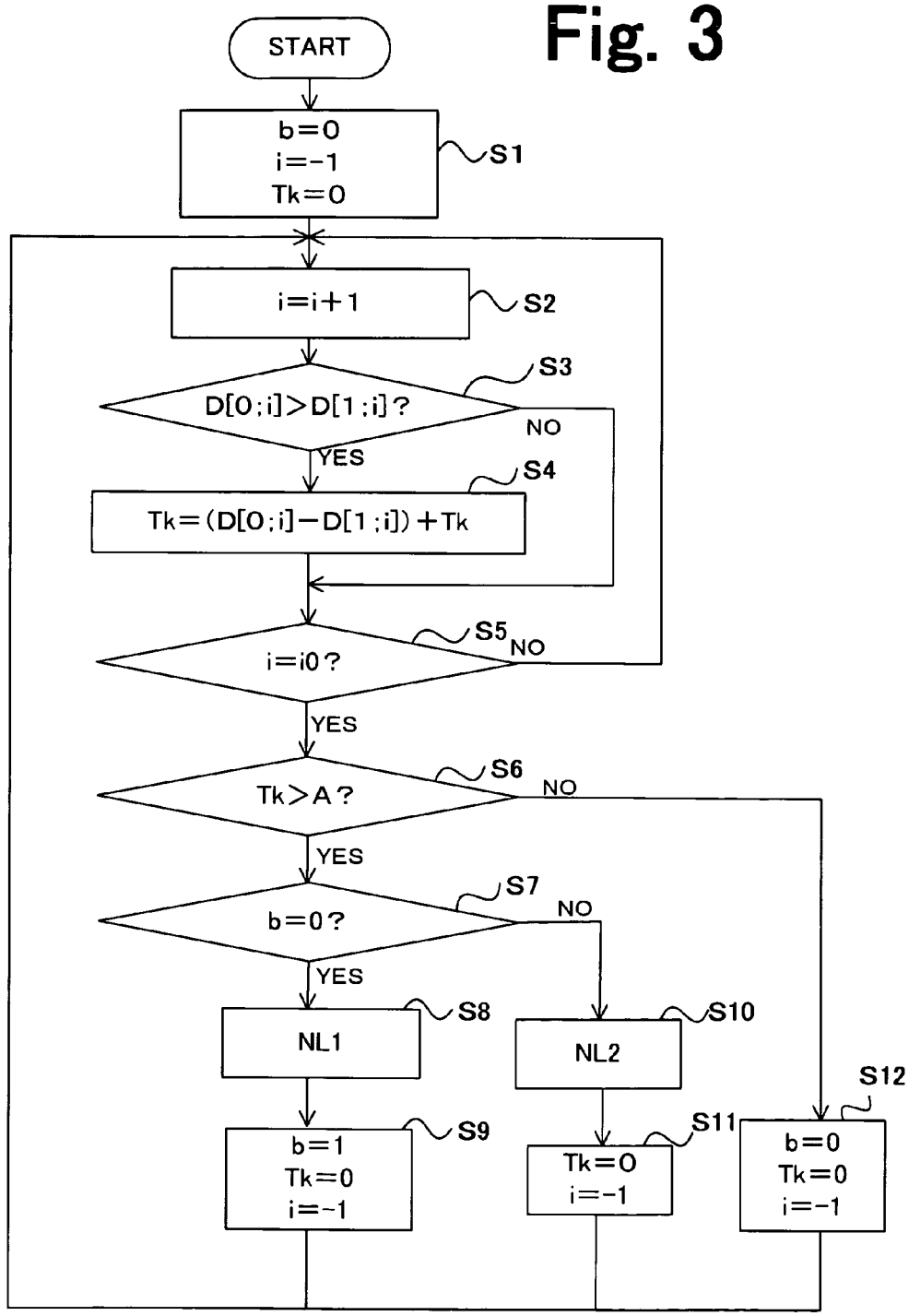
FIG. 3 is a flowchart for explaining operations of an interference removal function in the embodiment of the invention.

Operations in the interference detecting unit 8 and the interference removing unit 9 according to this embodiment will be explained with reference to a flowchart in FIG. 3. In this flowchart, a variable b is a parameter concerning "whether interference was detected last time" stored in the interference detecting unit 8. That is, "b=0" indicates that the interference detecting unit 8 did not detect interference last time and "b=1" indicates that the interference detecting unit 8 detected interference last time. Data stored in the line memories 6a, 6b, and 6c are represented as D[2; i], D[1;i], and D[0;i], respectively, using a parameter i concerning a depth. Tk is a parameter representing an integral value of intensity and A is a threshold for judging presence or absence of interference.

(Step 1) In the interference detecting unit 8, initial values are set as b=0, i=-1, and Tk=0.

(Step 2) The interference detecting unit 8 adds 1 to i.

(Step 3) The interference detecting unit 8 compares intensity of the reception signal D[0;1] received this time and intensity of the reception signal D[1:i] received last time at an identical depth.

(Step 4) When D[0;i] is larger than D[1;i] in step 3, the interference detecting unit 8 adds a value obtained by subtracting D[1:i] from D[0;i] to the parameter Tk representing an intensity integral value.

(Step 5) The interference detecting unit 8 judges whether is a value $i_0$ corresponding to a seabed position. The value $i_0$, which is information on a seabed position, has been inputted to the interference detecting unit 8 from the seabed detecting unit 7.

(Step 6) The interference detecting unit 8 judges whether Tk is larger than the predetermined threshold A determined on the basis of a detection range.

(Step 7) The interference detecting unit 8 judges, on the basis of a value of b, whether interference was detected last time.

(Step 8) The interference removing unit 9 executes the weak interference removal processing of NL1. The interference removing unit 9 outputs a smaller signal out of D[0;i] and D[1:i] for each i to the display processing unit 10 as a signal subjected to interference removal.

(Step 9) The interference detecting unit 6 changes the value of b to 1. The interference detecting unit 8 changes Tk to 0 and i to -1 and returns to step 2.

(step 10) The interference removing unit 9 executes the intense interference removal processing of NL2. The interference removing unit 9 outputs a signal of smallest one of D[0;i], D[1;i], and D[2;i] for each i to the display processing unit 10 as a signal subjected to interference removal.

(Step 11) The interference detecting unit 8 changes Tk to 0 and i to −1 and returns to step 2.

(Step 12) The interference removing unit 9 directly outputs the reception signal D[0;i] received this time to the display processing unit 10. The interference detecting unit 8 changes Tk to 0 and i to −1 and returns to step 2.

The threshold A is determined taking into account the number of data N of a reception signal, a water depth value, and the like.

In the above explanation, intensity of the interference removal processing is represented as two ranks, NL1 and NL2. However, as intensity of the interference removal processing, one rank or three or more ranks may be adopted.

When the seabed is not detected in the seabed detecting unit 7, the interference removal function in the interference removing unit 9 may be unconditionally turned on. Intensity of interference removal in this case may be NL1 or NL2.

What is claimed is:

1. A fish finder comprising:
a transducer that repeatedly transmits ultrasonic pulse signals downward into water and receives echo signals from the water;
an A/D converter that converts the signal received by the transducer into a digital signal;
a memory that stores the signal outputted from the A/D converter;
an interference detecting unit that detects an occurrence of interference on the basis of a reception signal belonging to a predetermined depth range among reception signals stored in the memory; and
an interference removing unit that when the interference detecting unit detects an occurrence of interference, outputs a signal obtained by applying predetermined interference removal processing to the reception signal, wherein the interference detecting unit calculates, for each identical depth, a difference value between intensity of a reception signal received at a time and intensity of a reception signal received at a previous time and, when a value obtained by adding up difference values over the depth range is larger than a predetermined threshold, detects an occurrence of interference.

2. A fish finder according to claim 1, wherein, in calculating a difference value between intensity of a reception signal received at a time and intensity of a reception signal received at a previous time, when intensity of the reception signal received at the time is higher than intensity of the reception signal received at the previous time for each identical depth, the interference detecting unit calculates a difference value between the intensity of the reception signal received at the time and the intensity of the reception signal received at the previous time.

3. A fish finder according to claim 1, wherein, in adding the difference values over the depth range, the interference detecting unit selects non-negative values out of the difference values and performs addition over the depth range.

4. A fish finder comprising:
a transducer that repeatedly transmits ultrasonic pulse signals downward into water and receives echo signals from the water;
an A/D converter that converts the signal received by the transducer into a digital signal;
a memory that stores the signal outputted from the A/D converter;
an interference detecting unit that detects an occurrence of interference on the basis of a reception signal belonging to a predetermined depth range among reception signals stored in the memory; and
an interference removing unit that when the interference detecting unit detects an occurrence of interference, outputs a signal obtained by applying predetermined interference removal processing to the reception signal, wherein, when the interference detecting unit detects an occurrence of interference, the interference removing unit outputs, for each identical depth, a signal with lower intensity out of the reception signal received at a time and the reception signal received at a previous time.

5. A fish finder comprising:
a transducer that repeatedly transmits ultrasonic pulse signals downward into water and receives echo signals from the water;
an A/D converter that converts the signal received by the transducer into a digital signal;
a memory that stores the signal outputted from the A/D converter;
an interference detecting unit that detects an occurrence of interference on the basis of a reception signal belonging to a predetermined depth range among reception signals stored in the memory; and
an interference removing unit that when the interference detecting unit detects an occurrence of interference, outputs a signal obtained by applying predetermined interference removal processing to the reception signal, wherein, when the interference detecting unit detects an occurrence of interference continuously for n times (n is an integer larger than 2), the interference removing unit outputs, for each identical depth, a signal with lowest intensity among reception signals for continuous n+1 times previous to the time.

6. A fish finder comprising
a transducer that repeatedly transmits ultrasonic pulse signals downward into water and receives echo signals from the water;
an A/D converter that converts the signal received by the transducer into a digital signal;
a memory that stores the signal outputted from the A/D converter;
an interference detecting unit that detects an occurrence of interference on the basis of a reception signal belonging to a predetermined depth range among reception signals stored in the memory;
an interference removing unit that when the interference detecting unit detects an occurrence of interference, outputs a signal obtained by applying predetermined interference removal processing to the reception signal; and
a seabed detecting unit that detects a position of a seabed on the basis of the reception signals stored in the memory, wherein
the predetermined depth range is a range from a position immediately below an oscillation line to the position of the seabed detected by the seabed detecting unit.

7. A fish finder according to claim 1, further comprising a detection range setting unit that sets a detection range, wherein
the predetermined threshold is changed on the basis of the detection range set.

8. An interference detection method in a fish finder, comprising:
- a step of repeatedly transmitting ultrasonic pulse signals downward into water and receiving signals from the water;
- a step of generating a first signal on the basis of reception signals at an identical depth resulting from a plurality of transmission signals; and
- a step of detecting an occurrence of interference on the basis of plural first signals at different depths.

9. A fish finder comprising:
- a transducer that repeatedly transmits ultrasonic pulse signals downward into water and receiving signals from the water;
- a first signal generating unit that generates a first signal on the basis of a reception signal at an identical depth resulting from a plurality of transmission signals; and
- an interference detecting unit that detects occurrence of interference on the basis of plural first signals at different depths.

10. A fish finder according to claim 9, further comprising:
- an A/D converter that converts the signal received by the transducer into a digital signal;
- a memory that stores a signal outputted from the A/D converter; and
- an interference removing unit that outputs, when the interference detecting unit detects an occurrence of interference, a signal obtained by applying predetermined interference removal processing to the reception sign.

* * * * *